Dec. 24, 1940.  C. H. GODSCHALL  2,225,828
NONSKID TIRE TRACK
Filed May 3, 1940
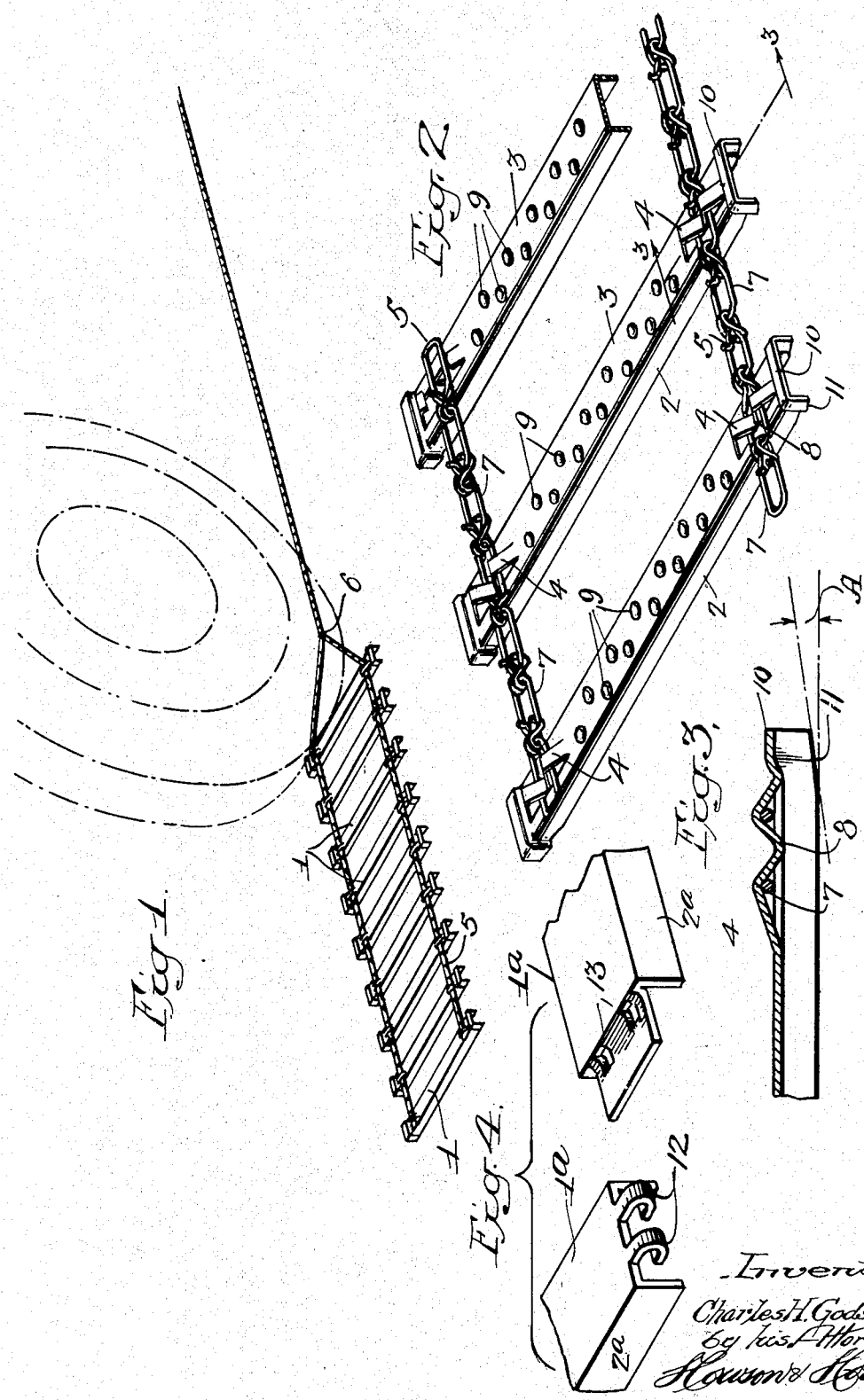

Patented Dec. 24, 1940

2,225,828

UNITED STATES PATENT OFFICE 2,225,828

NONSKID TIRE TRACK

Charles H. Godschall, Glenside, Pa., assignor to Philco Corporation, Philadelphia, Pa., a corporation of Pennsylvania Application May 3, 1940, Serial No. 333,225

7 Claims. (Cl. 238—14)

This invention relates to a novel traction device and more particularly to a device constructed and arranged to provide traction for a wheel of an automobile or other vehicle.

As is well known, it is not uncommon, particularly in the winter season and early spring, for automobiles to become stuck due to inability of the rear drive wheels to obtain adequate traction upon slippery pavements, snow, ice and in mud, and in many such instances it is impossible to obtain sufficient traction.

With this in mind, the principal object of the present invention is to provide a novel device or structure which may be readily placed for engagement by a wheel of an automobile and forced thereby to bite into the slippery undersurface thus affording a relatively fixed structure against which the tread of the tire or a tire chain may engage and obtain traction and momentum sufficient to effect forward or reverse travel of the automobile.

Another object of the invention is to provide a device of the character described which is relatively simple, efficient, inexpensive to manufacture and very easily handled and used.

These and other objects of the invention and the various features and details of its construction and use are hereinafter fully set forth and described and shown in the accompanying drawing, in which:

Figure 1 is a view in perspective of a device embodying the present invention showing the same in position for engagement by the wheel of a vehicle.

Figure 2 is an enlarged fragmentary view in perspective of a portion of the device illustrating certain features and details of its construction and arrangement.

Figure 3 is an enlarged fragmentary view in section taken on line 3—3, Figure 2; and Figure 4 is a perspective illustration of a modified form of one of the elements of the device.

Referring now more particularly to the drawing, a device made in accordance with the present invention may comprise a number of transverse tread members connected or secured together in spaced parallel relation by means of chains or the like. While in the accompanying drawing the tread members are shown and described as being in parallel relation, it will be readily understood that such relation is not necessary to the desired use of the device. Certain advantages may be obtained by spacing the cross treads in non-parallel relation, as by alternating the distance between the ends of the treads so that the track tends to center itself beneath a wheel.

More specifically the cross-tread members 1 may be formed from or constitute relatively short lengths of channel stock preferably of sheet metal of about sixteen gauge. In use, these channel cross-tread members 1 are preferably disposed with their flange or leg portions 2 extending downwardly for engagement with the pavement or ground and the surfaces of the connecting web portions 3 thereof facing upwardly for engagement by the wheel of the vehicle. If desirable, these flange portions 2 may be formed with jagged or toothed edges to more firmly anchor the several transverse treads to the underlying slippery surface.

Adjacent opposite ends of each such cross-tread member 1, a longitudinally disposed strap portion 4 is pressed out and upwardly from the web portions 3, and the said tread members 1 may be secured together in the spaced parallel relation shown by means of a single length of chain 5 of suitable strength which passes through the loops formed by the upwardly pressed strap portions 4 and looped at the forward end of the device as indicated at 6. This chain 5 preferably consists of flat relatively open links 7 so that said chain 5 may be tightly secured to or upon the several transverse tread members 1 merely by striking or otherwise forcing the strap portions 4 into clamping relation against the chain links 7 in such manner that an intermediate portion of said strap portions 4 projects into or through the openings of the links, for example, as indicated at 8 in Figure 3 of the drawing.

For the purpose of providing an increased grip or traction between a tire or wheel of the vehicle and the transverse treads 1, a number of projections 9 of more or less conical shape may be pressed upwardly from the web portions 3 of said treads at suitably spaced intervals over the surface thereof, and for the purpose of giving increased strength to the depending flange portions 2 of the treads 1, and particularly the end corner portions thereof, the ends of said treads are preferably flanged or beaded and outwardly and upwardly offset slightly during the forming operation, for example, in the manner indicated at 10.

These raised flanges or beads 10 serve effectively to reinforce the side flanges 2 of the treads 1 so that they have a substantially greater resistance against collapsing or buckling under the weight of the vehicle and the stresses and forces received from the drive of a wheel thereof. Also, by thus slightly raising or elevating the ends of the side flanges 2 on the treads 1 the end portions of the under edges of said flanges are inclined as shown at 11 in Figure 3 and hence normally are free from engagement with the pavement or other surface.

This inclination of the end portions of the flanges is an important feature of the invention for I have found that if the end portions of the edges of the flanges 2 are not so inclined, the end portions of the flanges at one or the other end of the cross-tread members 1 usually are forced into engagement with the pavement or other underlying surface prior to or ahead of the remainder of the flanges with the result that the entire load is placed upon such corner portions and they are caused to collapse or buckle under the said tread members. To the contrary, however, by inclining the end portions of the edges of the flanges 2 as above described so that they are disposed at an angle to the pavement or other surface, such as A in Figure 3, the major portion of the length of said flanges is caused to initially engage such surface with the result that the flanges are afforded a materially greater resistance to deformation.

In certain instances, it may be desirable to construct the transverse treads of two shorter channel elements or sections 1a suitably connected together, for example, by means of interlocked lugs 12 and apertures 13 as shown in Figure 4 of the drawing, so that the said sections may pivot about said interlock relative to each other. This arrangement enables the transverse treads to adapt themselves to the general contour of the underlying surface whether concave and rutty or convex, as in the case of a crowned roadway, and thereby insure engagement of the underlying surface by as much as possible of the length of the flange portions 2a of said treads.

As illustrative of the expected use and operation of the device of the present invention, the looped end 6 of the chain 5 is tucked beneath a wheel of an automobile or other vehicle forwardly thereof with the remainder of the device, including the transverse treads 1 or 1a, extending forwardly from the wheel and in the line of its path of travel, for example, as illustrated in Figure 1 of the drawing.

Now with the device positioned as described, as power is applied to the vehicle wheel to rotate it, the tread of the tire on the wheel will catch the looped end 6 of the chain 5 of the device thus drawing or pulling the latter until the first transverse tread is engaged by the wheel. The pressure exerted by the wheel upon this first tread will cause the flanges thereof to bite into the underlying slippery surface and effectively stake or embed the device therein. Good traction is then afforded the wheel by the projections 9 on the treads with the result that the vehicle is given the initial momentum required to begin its forward movement. The same action takes place as each subsequent transverse tread of the device is successively engaged by the wheel and as the last tread is engaged the vehicle has gained sufficient momentum to continue its forward travel without further aid from the said device.

Thus another important feature of the present invention resides in the construction and arrangement of the cross-tread members 1 whereby they are successively staked and embedded in the underlying surface by the weight of the automobile thus affording good traction between the device and the underlying surface, and while adequate traction normally exists between the tire of an automobile and a device such as this, it is the ability of the present device to afford good traction between it and the underlying slippery surface that renders it successful and distinguishes it from other devices and expedients heretofore used.

In order that it need not be necessary subsequently to stop the vehicle to retrieve the traction device after once getting said vehicle under way, a suitable length of chain, rope or the like may be connected, for example, by snap catches or other means, to the looped end 6 of the chain 5 of the device and to the bumper or other suitable part of the vehicle.

From the foregoing, it will be seen that the present invention affords a novel device for providing effective traction for a wheel or wheels of an automobile and like vehicles which is very easily and readily handled and used, and can be economically manufactured and sold. Such a traction device has numerous uses and can be easily and successfully utilized in any instance where it is desired to increase the traction between a driven wheel and the underlying roadway or other surface.

While a particular embodiment of the invention has been herein illustrated and described, it is not intended that said invention be limited to such disclosure but that changes and modifications may be embodied and incorporated therein within the scope of the annexed claims.

I claim:

1. A traction device for automobiles and the like comprising a plurality of spaced parallel cross-tread members each consisting of two sections of inverted channel shape pivotally connected together about an axis transverse the member, and chains connecting said cross-tread members extending laterally thereof and secured to said treads adjacent the ends thereof.

2. A traction device for automobiles and the like comprising a plurality of spaced parallel cross-tread members of inverted channel shape having their opposite end portions up-set to form a raised bead, and chains connecting said cross-tread members and extending laterally thereof and secured to said treads adjacent the ends thereof, said raised bead functioning to reinforce and prevent buckling of the end portions of the side flanges of the channel shaped cross-tread members.

3. A traction device for automobiles and the like comprising a plurality of spaced parallel cross-tread members of inverted channel shape having their opposite end portions up-set to form a raised bead to reinforce and prevent buckling of the end portions of the side flanges thereof, said cross-tread members having outwardly pressed portions inwardly adjacent the raised beads at opposite ends thereof, and chains connecting the said cross-tread members secured to the latter by said pressed out portions thereof.

4. A traction device for automobiles and the like comprising a plurality of spaced parallel cross-tread members of inverted channel shape having their opposite end portions up-set to form a raised bead to reinforce and prevent buckling of the end portions of the side flanges thereof, said cross-tread members having outwardly pressed portions inwardly adjacent the raised bead at opposite ends thereof, and a flexible member extending laterally of the cross-tread members for limiting the spacing thereof and being secured to said members by the pressed out portions thereof.

5. A traction device for automobiles and the like comprising a plurality of spaced parallel cross-tread members of inverted channel shape having their opposite end portions up-set to form a raised bead to reinforce and prevent buckling of the end portions of the side flanges thereof, said cross-tread members having outwardly pressed portions inwardly adjacent the raised beads at opposite ends thereof, and means flexibly connecting the cross-tread members comprising a doubled single length of chain having its respective courses secured laterally of said tread members by the pressed out portions thereof and forming a loop at one end of the device.

6. A traction device for automobiles and the like comprising a plurality of spaced parallel cross-tread members of inverted channel shape having their opposite end portions up-set to form a raised bead to reinforce and prevent buckling of the end portions of the side flanges thereof, strap portions pressed out from said cross-tread members to form loop openings adjacent opposite ends thereof, and means connecting the cross-tread members together comprising a member passing through said loop openings and clamped to said tread members by said strap portions thereof.

7. A traction device for automobiles and the like comprising a plurality of spaced parallel cross-tread members of inverted channel shape having their opposite end portions up-set to form a raised bead to reinforce and prevent buckling of the end portions of the side flanges thereof, strap portions pressed out from said cross-tread members to form loop openings adjacent opposite ends thereof, and means flexibly connecting said cross-tread members comprising a doubled length of chain having its respective courses passing through the loop openings adjacent opposite ends of the tread members and clamped to the latter by said strap portions thereof.

CHAS. H. GODSCHALL.